(12) United States Patent
Inami et al.

(10) Patent No.: US 6,341,869 B1
(45) Date of Patent: Jan. 29, 2002

(54) METHOD AND DEVICE FOR PROVIDING INFORMATION

(75) Inventors: Masahiko Inami, Tokyo; Naoki Kawakami, Tottori; Yasuyuki Yanagida, Tanashi; Taro Maeda, Tokyo; Susumu Tachi, Tsukuba, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/371,412

(22) Filed: Aug. 10, 1999

(30) Foreign Application Priority Data

Aug. 11, 1998 (JP) .......................... 10/226677
Jan. 28, 1999 (JP) .......................... 11/020621

(51) Int. Cl.⁷ .................. G03B 21/26; G03B 21/28; G02B 27/14
(52) U.S. Cl. .................. 353/28; 353/28; 353/97; 359/630; 359/632; 359/633
(58) Field of Search .................. 353/11, 12, 13, 353/14, 28, 30, 97; 359/630, 632, 633; 345/156, 173; 348/14.01, 14.07, 14.08, 14.1

(56) References Cited

U.S. PATENT DOCUMENTS

| | | | | |
|---|---|---|---|---|
| 5,418,584 A | * | 5/1995 | Larson | 353/122 |
| 5,726,806 A | * | 3/1998 | Holden et al. | 359/630 |
| 5,861,993 A | * | 1/1999 | Shanks et al. | 359/630 |
| 5,913,591 A | * | 6/1999 | Melville | 353/28 |
| 5,982,352 A | * | 11/1999 | Pryor | 345/156 |
| 6,008,800 A | * | 12/1999 | Pryor | 345/173 |
| 6,008,945 A | * | 12/1999 | Fergason | 359/630 |
| 6,045,229 A | * | 4/2000 | Tachi et al. | 353/28 |

FOREIGN PATENT DOCUMENTS

JP 08-257947 A 8/1996

OTHER PUBLICATIONS

Cruz–Neira, Carolina, Sandin, Daniel J., and DeFanti, Thomas A., "Surround–Screen Projection–Based Virtual Reality: The Design and Implementation of the CAVE", *Computer Graphics Proceedings*, Annual Conference Series, 1993, pp. 135–142.

Noma, Haruo, Miyasato Tsutomu, and Kishino, Fumio, "Force Sense Interface for Manipulating an Object by Using a Small Display", *The Eleventh Human Interface Symposium Papers*, Oct. 18–25, 1995, pp. 491–496, Kyoto, Japan.

Iwata, Hiroo and Ichigaya, Atsuro, "Haptic Screen", *Japan Virtual Reality Institute First Convention Papers*, Oct., 1996, pp. 7–10.

Hirose Et Al, "A Development of Immersive Multiscreen Display (CABIN)", *Japan Virtual Reality Institute Second Convention Paper*, pp. 137–140, 1997.

(List continued on next page.)

*Primary Examiner*—William Dowling
*Assistant Examiner*—Rochelle Blackman
(74) *Attorney, Agent, or Firm*—Sidley Austin Brown & Wood

(57) ABSTRACT

A projector is disposed at a position that is optically conjugated to a position of eyes of an observer. The projector projects an image to a screen that has retroreflection function so as to provide information of virtual space to the observer. If a real object such as a tactile sense provision device that is to be shielded by the virtual space exists, a part or the whole of the real object is optically hidden from the projection of the projector by a shielding member having retroreflection function, for example, by placing a shielding screen on which a retroreflection material is coated, or by coating the retroreflection material.

9 Claims, 9 Drawing Sheets

OTHER PUBLICATIONS

Yokokohji Et Al, "What You Can See is Whay You Can Feel—Development of a Virtual/Haptic Interface to Virtual Environment", Proceedings of VRAIS '96, pp. 46–53, 1996.

Ozaki Et Al, "Tele–existence from Virtual Viewpoints—Creating virtual space using scenery planes—", Thirty–fifth Instrumentation and Automatic Controls Institute Scientific Lecture Papers, pp. 209–210, 1996.

Hirose Et Al, "3–D Virtual Space Generation by Using 2–D Photo Images", Instrumentation and Automatic Controls Institute, Human Interface N & R, vol. 11, No. 2, pp. 209–214, 1996.

* cited by examiner

METHOD AND DEVICE FOR PROVIDING INFORMATION

BACKGROUND OF THE INVENTION

This application is based on Japanese Patent Application No. 226677/1998 filed on Aug. 11, 1998 and No. 20621/1999 filed on Jan. 28, 1999, the contents of which are incorporated herein by reference.

1. Field of the Invention

The present invention relates to a method and a device for providing information used in the field of virtual reality (VR) or computer visualization. More specifically, the present invention relates to a method and a device for interactively providing a virtual object without inconsistency with a real object concerning their shielding relationship.

2. Description of the Prior Art

In recent years, researches about engineering applications of the artificial reality by positively fusing the physical space and the information space have been activated, which include a study about the complex reality. However, most of the researches utilize a head mounted display (HMD) or a normal projector. In this case, their reality can be substantially deteriorated due to an inconsistency between the real object and the virtual object concerning their shielding relationship.

In addition, when providing not only for the visual sense but also the tactile sense including interaction with a virtual object, as disclosed in Japanese Unexamined Patent Publication No. 8-257947(A), for example, the tactile sense provision device can interfere with the visual sense provision device visually and physically. This is a large problem for realizing a system that provides the visual sense and the tactile sense simultaneously.

Reality Fusing

If the physical space where a human is living and the information space that is structured by computers and communication networks are fused seamlessly, the society will be more highly computerized or information-based. To realize the more highly information-based society, a concept such as a wearable computing or a ubiquitous computing is proposed.

Here, the meaning of seamless fusion will be investigated. In the field of psychology, etc., a process is called "fusion" that gives a novel sense image having a close relationship with plural information and not being generated by itself toward a certain phenomenon or an object, as shown in binocular fusion, for example.

In the engineering field too, a sensor fusion by integrally processing information obtained by plural sensors is being researched, which will provide a novel sensing function that is not obtained from a single sensor.

In the same way, it is expected to obtain a new effect that is not obtained from a single space, as a result of not only a simple mixture of such spaces as the physical space where a human exists and the information space of computers or the visual space and the tactile space but also the seamless fusion thereof.

Fusion of the Physical Space and the Information Space

Along with building up of the information and communication infrastructure, it is considered that on demand type and bidirectional type communications will be the mainstream instead of the conventional broadcast type communication. Moreover, for an application that requires higher interactivity, it is considered that the information will be more personalized and the personal reality fusion of the personal information will be necessary.

Therefore, as a personal interface, this reality fusion should be realized at low cost and compactly.

However, the conventional display, in which the device itself occupies a large percentage of weight and volume, is not suitable for a personal application.

Compared with the conventional display mentioned above, a head mounted display (HMD) that is used in a field of virtual reality recently is suitable for creating a personal information space. However, the HMD is hard to be used in the physical space since the display can screen off the physical space, so that a work of an operator in the physical space is very difficult. Therefore, the image of his or her own body can be seen only as a metaphor by a computer graphics (CG), resulting in low ability of self-projection that is considered an important factor of the reality.

Another type of HMD, i.e., a see-through type HMD is also proposed, in which an image of the information space is superimposed on an image of the physical space using a half mirror or a head mounted camera. This has a principle disadvantage of working such as an inconsistency of the shielding relationship between provided objects or that of the focal points in the work space portion since the composition of images is performed in a position adjacent to the observer's eyes or in the computer. The problem concerning the inconsistency of the shielding relationship can occur also in an immersive projection display such as a CAVE (Carolina Cruz-Neira et al. "Surround-Screen Projection-Based Virtual Reality: The Design and Implementation of the CAVE" COMPUTER GRAPHICS Proceedings, Annual Conference Series, pp. 135–142, 1993) or a CABIN (Hirose et al. "A Development of Immersive Multiscreen Display (CABIN)", Japan Virtual Reality Institute Second Convention Paper, pp. 137–140, 1997, which have been widely used these days.

Display Fusing Visual and Tactile Senses

It is reported that presence and workability are improved by providing an object in the information space including not only visual information but also tactile information.

However, when trying to provide the visual information and the tactile information simultaneously, the visual information provision device and the tactile information provision device interfered with each other optically and geometrically. This problem is similar to that in fusing the physical space and the information space, which is caused by the fact that the providing portion of the interface exists in the physical space. Concerning this problem, some studies have been reported up to now, for example, in WYSIWYF display (Yokokohji et al. "What You Can See is What You Can Feel-Development of a Visual/Haptic Interface to Virtual Environment", Proceedings of VRAIS '96, pp. 46–53, 1996, PDDM (Noma et al. "Haptic Interface for Direct Manipulation with Palmtop Display", The eleventh Human Interface Symposium Papers pp. 491–496, 1995), and Haptic Screen (Iwata et al. "Haptic Screen," Japan Virtual Reality Institute First Convention Papers, pp. 7–10, 1996). However, in most cases, the problem of the shielding relationship is still ignored or it is addressed by optical superimposition using a half mirror.

Reality Fusion Structure

Here, it is supposed that most of the problems in the conventional system are caused by the fact that the physical space and the information space are composed outside the point where the both objects of the physical space and the information space are to be interacted. In other words, it is extremely difficult for the conventional technology to cover all of the reality fusion from short distance to long distance by a single display. To solve this problem, it may be better to use different distances and sizes of the devices in accordance with the application.

From the viewpoint of the above-mentioned recognition, the inventor has proposed an object-oriented display, which is suitable for observing and operating a virtual object on hands (Japanese Patent Application No. 10-172722). The object of the present invention is to enhance the concept and to realize seamless reality fusion in wider area by "displaying close objects by a near display while displaying far objects (landscape) by a distant display" similarly to flats on a stage.

This method is also considered as an implement in the real world of the three-dimensional virtual space generation method by flats method in the image based rendering field (Ozaki et al., "Tele-existence from Virtual Viewpoints—Creating Virtual Space Using Scenery Planes", Thirty-fifth Instrumentation and Automatic Controls Institute Scientific Lecture Papers, pp. 209–210, 1996, Hirose et al., "3-D Virtual Space Generation by Using 2-D Photo Images", Generation of the Three-Dimensional Virtual Space by Using the Two-Dimensional Real Image," Instrumentation and Automatic Controls Institute, Human Interface N & R, Vol. 11, No. 2, pp. 209–214, 1996).

However, in order to perform the reality fusion properly in a wide area, it is required to dispose displays unevenly in the wide area in accordance with the display area. In other words, it is necessary to construct a so-called ubiquitous display. The conventional displays are impractical because they require huge space and cost.

The conventional displays are effective for broadcasting type information provision, which continuously provides one-way and non-directional information toward a space including scores of observers. However, when the conventional display is used as a personal information provision device in the interactive application, i.e., used for a specific observer, the information is transmitted to the direction where no observer exists since it is a non-directional display, resulting in a waste. In addition, if the information is observed by people other than the aimed observer, it is difficult to protect privacy of individuals.

Namely, as an interactive image display device, a device "observee" is needed that is observed by a human rather than a display device for displaying an image for the human.

This "observee" may be constructed as a system for providing an image in the area where the observer can see. The system does not need to provide an image in the area that is shielded by an object or the back surface that cannot be seen by the observer.

In order to realize the function of the observed information provision device, "observee," an image provision system that can form a projection volume which agrees with the viewing volume that is the view area of a human may be promising.

There is a system performing the above-mentioned function, which provides an image only to the observer by using an optical system such as lenses so that the image follows the observer, whose position is previously measured. There is another system, which projects an image from the view point that is conjugated to the observer to a retroreflection screen that reflects a light ray to the incident direction.

However, the former observer following type system is difficult to use for a simultaneous and unevenly existing application since the display device requires much cost. The latter projection type image provision system has an advantage in that a lot of display screens with light weight can be produced very easily by integrating space and cost for displaying image in the projector side. It has another advantage in that the limited band of the communication infrastructure can be used effectively by providing information necessary for the observer at the necessary level. In addition, since people other than the observer cannot see the image, privacy of the observer can be protected.

Furthermore, in the situation where one or more displays are required for one person, it is better in cost performance to add the information generation function not to the space side but to the person side.

Furthermore, the observer following system can cause problems such as focus depth due to variation of the screen position and light quantity. Since a display device for displaying an image for a human is usually aimed at providing information in a wide area, one target of the research is to widen the view angle of the display.

The conventional screen is not the exception. The object of the device is to diffuse the incident light by using glass beads. Namely, a screen used for the "display" in a movie theater, for example, has an essential characteristic that the light quantity varies inversely with the square of the distance.

Therefore, the necessary function of the screen to realize the "observee" is not to diffuse the incident light but to reflect the incident light retrorsely in the direction of the observer.

Furthermore, the "observee" can provide unique image information to each person. One physical device can provide unique image information to each person seeing the device. Thus, the space can be used more efficiently.

Though the inventor has proposed a method for displaying image to realize the "observee" in Japanese Patent Application No. 10-172722, it has a problem as follows.

When providing a sense information except the visual sense information, especially a tactile sense information to the observer in the virtual space, the device for providing the tactile information should be disposed in front of the observer, for example. In some cases, a human state measuring sensor such as a three-dimensional position sensor may exist between the eyes of the observer and the displayed image.

If the object that is not to be seen in the virtual space is seen by the observer, the reality of the virtual environment can be deteriorated. Especially, if the object that is not to be seen in front of the displayed image is seen, the object produces shielding of the visual sense, and the displayed image has a blind spot. Thus, the reality of the image is substantially deteriorated.

A critical case of this problem can occur when the front and rear relationship between the virtual object and the real object becomes opposite. In this case, transparent view interpretation is generated, in which the object is seen as transparent, resulting in substantial deterioration of the reality.

For example, FIG. 5(A) shows a natural relationship that a virtual ball BL1 is seen in front of the hands HD of a real human, while FIG. 5(B) shows the inverse relationship concerning front and rear of the ball BL1 and the hands HD, generating inconsistency of the shielding relationship, which is not natural.

Therefore, it is important to display an image so that a real object to be not seen existing between the observer and the displayed image cannot be seen, while another object to be seen can be seen, thus any inconsistency cannot occur concerning the shielding relationship between the real object and the virtual object.

SUMMARY OF THE INVENTION

The object of the present invention is to provide a method and a device for providing information, which can provide the correct shielding relationship between the real object and the virtual object, as well as a virtual space with a high reality.

A method of the first aspect of the present invention, as shown in FIGS. 1 and 2, provides information of the virtual space to an observer BS by projecting an image, toward screens 11 and 11A having retroreflection function, from projectors 14 and 14A disposed at the position that is optically conjugated to the position of eyes of the observer BS. If real objects JT, e.g., tactile sense provision device 16 and 16Z, which are to be hidden by the virtual space, exist, a part or the whole of the real objects JT, i.e. 16 and 16Z, are optically hidden from a projection by the projectors 14 and 14A by a shielding member having retroreflection function, e.g., by disposing a shielding screen 18 on which a retroreflection material is coated, or by coating a retroreflection material 18A and 18Z.

A method of the second aspect of the present invention hides the real object JT by coating a retroreflection material on the real object JT.

A method of the third aspect of the present invention hides the real object JT by disposing a shielding screen 18 having retroreflection function in front of the real object JT.

In a method of the fourth aspect of the present invention, a tactile sense provision device 16 is provided for providing a tactile sense to the observer BS. The tactile sense provision device 16 is hidden by disposing a shielding member such as a shielding screen 18 on which a retroreflection material is coated or by coating a retroreflection material 18A and 18Z.

In a method of the fifth aspect of the present invention, a real object JT is disposed between the observer BS and the screens 11 and 11A, retroreflection function is added to the portion that is to shield the real object JT from the virtual space. Concerning the portion of the real object JT to be shielded, an image that is projected to the portion of the real object JT to be shielded is provided to the observer instead of the image to be projected to the screen 11 and 11A.

A method of the sixth aspect of the present invention, as shown in FIG. 7, provides information of the virtual space by optically hiding a part or the whole of the real objects JT disposed between the background object 11B and the observer BS. To the portion of the real objects JT to be hidden, the image of the background object 11B corresponding to the portion is projected by the projector 14B disposed at the position optically conjugated to the position of eyes of the observer BS. It is preferable that the portion of the real objects JT to be hidden is covered with a retroreflection member 18B or a retroreflection material 18Ba is coated as shown in FIG. 9.

A device of the seventh aspect of the present invention includes a projector 14A for projecting an image disposed at the position that is optically conjugated to the position of eyes of the observer, an image generating device 13A for generating an image of an object to be observed by the observer BS and outputting the image to the projector 14A, a screen 11A having retroreflection function for displaying the image projected by the projector 14A, and a tactile sense provision device 16 for providing tactile sense to the observer BS. The tactile sense provision device 16 is shielded optically from the projection by the projector 14A by a shielding member having retroreflection function, e.g., by a retroreflection screen 18 on which a retroreflection material is coated or by coating a retroreflection material 18A and 18Z.

DESCRIPTION OF THE PREFERRED EMBODIMENTS

Figure 2:
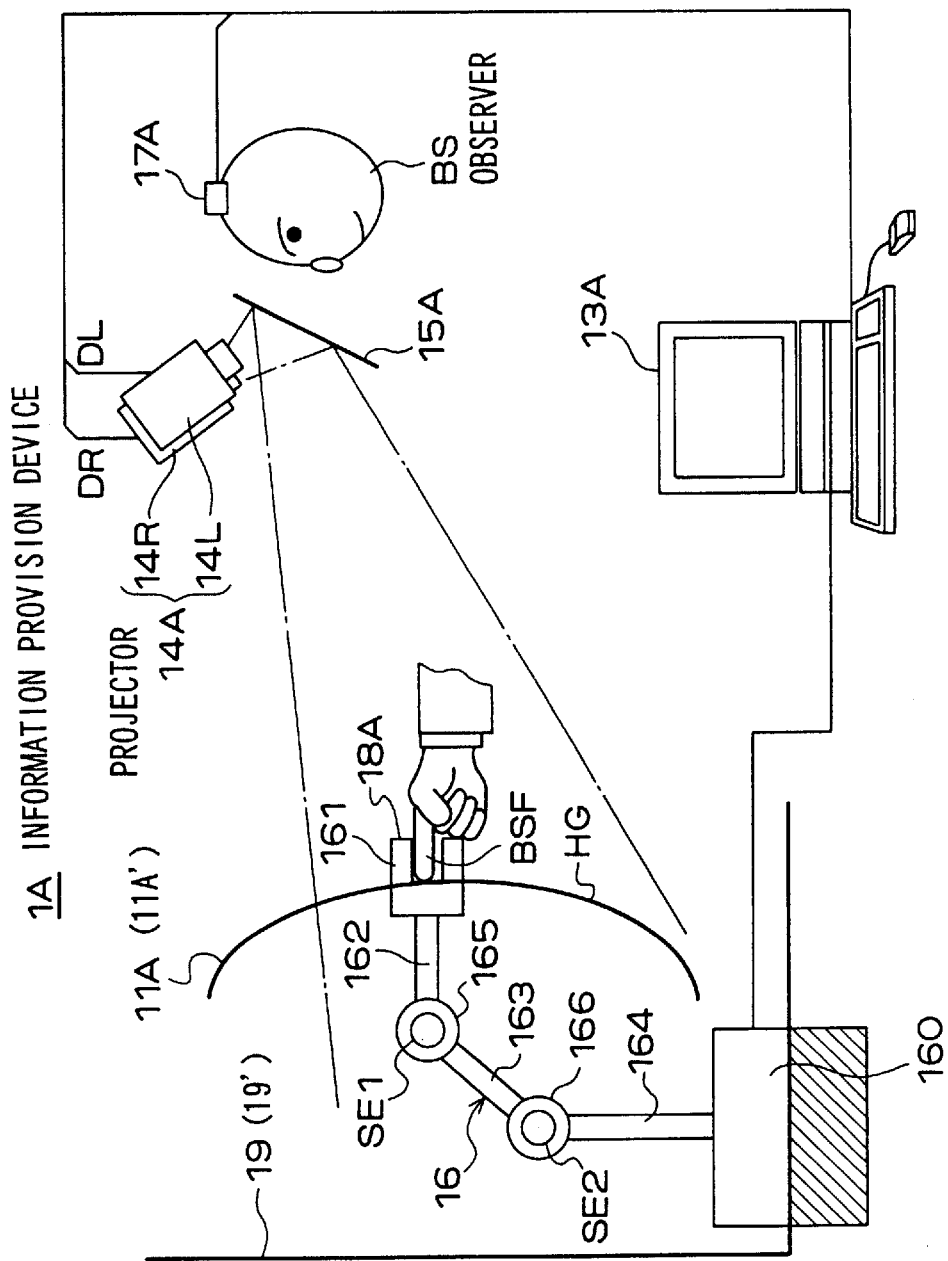
FIG. 2 is a diagram showing the location of the information provision device according to one embodiment of the present invention.
Figure 3:
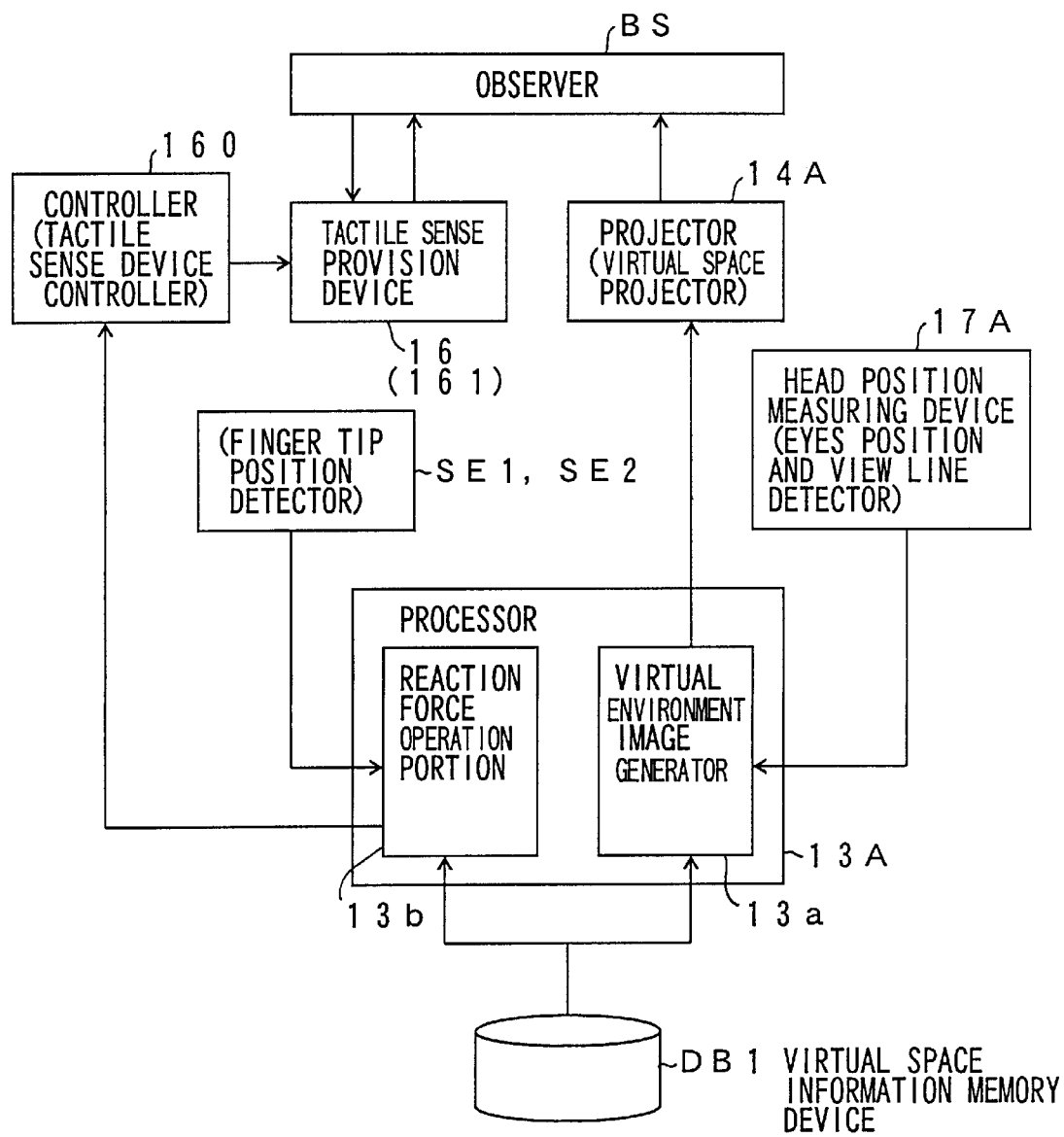
FIG. 3 is a block diagram showing the functions of the information provision device according to the embodiment.
Figure 4:
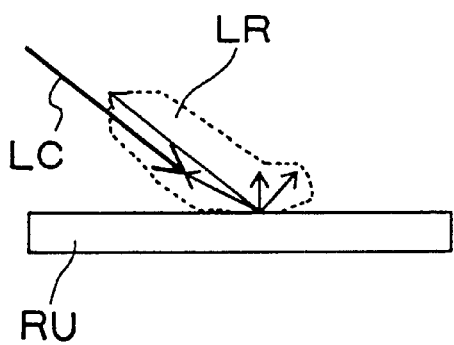
FIGS. 4(A) and 4(B) are diagrams for explaining retroreflection function of the retroreflection material used for a screen.
Figure 4:
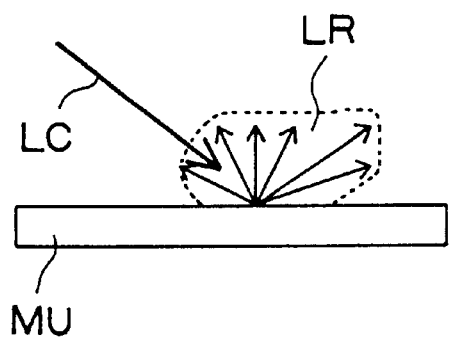
Figure 5:
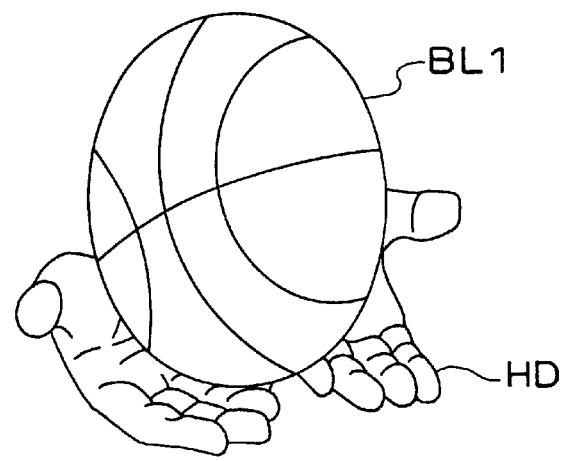
FIGS. 5(A) and 5(B) are diagrams showing an example of correct and incorrect shielding relationship.
Figure 5:
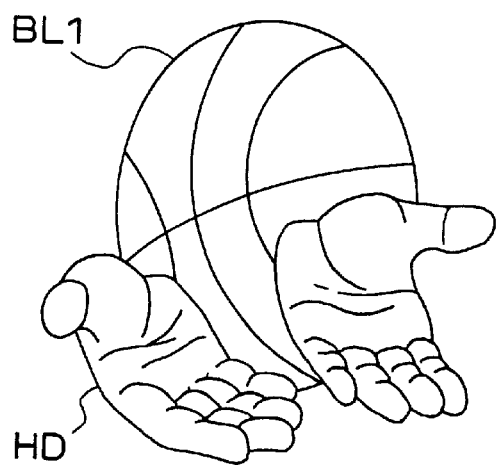

FIG. 2 shows the location of an information provision device 1A of a first embodiment of the present invention. FIG. 3 shows the functions of the information provision device 1A of the embodiment. FIG. 4(A) is an explanatory drawing showing the retroreflection function of a retroreflection member RU used for a screen 11A.

In FIGS. 2 and 3, the information provision device 1A includes a screen 11A, a processor 13A, projectors 14L and 14R, a semitransparent mirror 15A, a tactile sense provision device 16, a head position measuring device 17A, and a background screen 19. The projectors 14L and 14R are for left and right eyes, respectively. They have the same configuration of a small diameter for a single eye. Therefore, each or both of the projectors 14L and 14R may be referred to "a projector 14A."

The screen 11A is used for displaying an image HG projected by the projector 14A so as to provide the visual information of the object (virtual object) that is a content of the image HG to the observer BS. Though the shape of the screen 11 can be any shape, it is preferably a shape that is the same as or similar to the object provided by the image HG. However, it is not efficient to make the screen 11A according to each shape of the objects. Therefore, the shape of the screen 11A can be any shape corresponding to the object, such as a plane, a curved surface or a closed surface. The closed surface may have a spherical shape, an egg shape, a polyhedron shape or a toroidal shape.

The material used for the body of the screen 11A is preferably light and easy to form into any shape, such as a plastic foam. A retroreflection material containing glass beads is coated on the surface of the screen 11A, which thus becomes a retroreflection screen having retroreflection function.

As shown in FIG. 4(B), light will be reflected by the normal material MU in every direction (reflected light LR) not depending on the incident angle so much (incident light LC). However, as shown in FIG. 4(A), almost all of the reflected light LR of the retroreflection screen with the retroreflection material RU goes back in the direction of the incident light LC. Therefore, the image projected to the surface of the screen 11A has high intensity in the direction of the eyes of the observer BS. Namely, the observer BS can see the image projected on the screen 11A with very high intensity.

The retroreflection material RU is a material that reflects light with high directivity to the light source, which is realized by a corner cube array or glass beads.

The processor 13A generates and sends out image information DL and DR for the left and right projectors 14L and 14R, in a virtual environment image generator 13a. For example, an image of an object having an egg shape as a whole is generated for an egg-shaped screen 11A having volleyball size. The image may include an image of a small animal such as a cat, a rabbit or a squirrel. The generated image is a three-dimensional image having three-dimensional information. Therefore, each of the image information DL and DR having two-dimensional images from any view point is output.

In other words, the processor 13A generates image information DL and DR that is revised so that a proper image is displayed on the screen 11A in accordance with the view point of the observer BS facing the screen 11A. Namely, the content, shape and position of the image projected by the projectors 14L and 14R are changed so as to follow the change of the positions of the screen 11A and the observer BS. For example, if a front image of an object is displayed on the screen 11A when the observer BS rotates the screen 11A around the vertical axis by 90 degrees, the content of the image is changed so that the side view image of the object is displayed on the screen 11A.

There is parallax between the image information DL and DR which are output to the projectors 14L and 14R, so that the observer BS can see the three-dimensional image projected to the screen 11A by his or her left and right eyes.

The processor 13A calculates a reaction force to be applied to an operation portion 161 of the tactile provision device 16, in a reaction force operation portion 13b, and gives an instruction to the controller 160.

A microcomputer, a personal computer or a workstation can be used as the processor 13A. The processor 13A includes data and program for computer graphics, rendering software, and other control programs in order to generate the above-mentioned image information DL and DR. The processor 13A refers virtual space information memory DB1 storing database of shape models of objects. The virtual environment image generator 13a and the reaction force operation portion 13b are realized as one of functions performed by the programs.

It is preferable that opening diameter of the projector 14A can be stopped down as much as possible to project an image with deep depth of focus. For example, the opening diameter is preferably less than 5 cm, more preferably less than 2 cm, and further preferably less than 1 mm. The smaller the opening diameter, the deeper the depth of focus is, so that a pinhole optical system is formed.

The projector 14A is disposed at the position that is optically conjugated to the position of left and right eyes of the observer BS. In this case, the head mount type is desirable, which can be mounted on the head of the observer BS integrated with the semitransparent mirror 15A.

In order to realize the head mount type projector 14A, it is better to attach the projector 14A, the semitransparent mirror 15A and the head position measuring device 17A to a cap or a helmet that the observer BS can wear on his or her head. Alternatively, in the same way as the head mounted display, it can be mounted on the head or on the face using a band.

The semitransparent mirror 15A reflects the light projected by the projector 14A and permits the light of the image displayed on the screen 11A to pass through. Due to the semitransparent mirror 15A, the projector 14A is disposed at the position that is optically conjugated to the position of left and right eyes of the observer BS. Thus, the observer BS can see the object displayed on the screen 11A.

The tactile sense provision device 16 provides tactile sense to the finger BSF of the observer BS. Namely, the tactile sense provision device 16 includes an operation portion 161 in which the finger is put for operation, and which is movably supported by arms 162–164 and actuators. 165 and 166. The operation portion 161 is attached to the screen 11A, which moves along with the operation portion 161. Thus, the position and the posture of the screen 11A are determined by the position and the posture of the operation portion 161.

The actuators 165 and 166 drive the operation portion 161 and let the operation portion 161 generate a reaction force. Angle sensors SE1 and SE2 are disposed at each position of the actuators 165 and 166 for detecting angles of the arms 162–164. On the basis of the output signals of the angle sensors SE1 and SE2, the position and the posture of the screen 11A in the three-dimensional space is measured in real time. Hereinafter, the term "Position" can mean both position and posture. The controller 160 controls the overall operation portion 161 in accordance with the output signals of the angle sensors SE1 and SE2 and the instruction from the processor 13A.

The operation portion 161 of the tactile sense provision device 16 is usually located in front of the screen 11A and can be seen by the observer BS. However, the portion 161 is naturally not to be seen when the virtual space is provided. Therefore, in order to optically hide the operation portion 161 from the projection by the projector 14A, the retroreflection material 18A is coated on the operation portion 161. In addition, any other part, of the tactile sense provision device 16 that can be seen by the observer BS, is also coated with the retroreflection material 18A.

The tactile sense such as a weight sense given to the observer BS can be provided by pulling down the screen 11A with a power corresponding to the virtual weight of the object. Other tactile sense includes a reaction force sense when shooting something, a viscous sense when moving the object in water or other fluid having high viscosity, a sense of swing when the object is swung by wind, or a bouncing force when a virtual ball hits a virtual wall. Using the tactile sense provision device 16, the observer BS can experience the force of the object in the image projected to the screen 11A.

The head position measuring device 17A is mounted on the head of the observer BS and measures the position of the head, i.e., the position and the direction of eyes. The measured signal of the head position measured by the device 17A is fed back to the processor 13A. The processor 13A calculates the relative distance between the screen 11A and the observer BS in accordance with their positions, and the view point of the observer BS toward the object.

The background screen 19 is a retroreflection screen disposed behind the screen 11A. A background of the object projected to the screen 11A is projected to the background screen 19. The background screen 19 can be a wall surface or a floor surface coated with the retroreflection material. Alternatively, it can be a sheet having retroreflection function.

Hereinafter, the operation of the information provision device 1A will be explained. Here, initial positions of the tactile sense provision device 16 and the observer BS are assumed to be previously adjusted in the virtual space.

The processor 13A generates the image of the virtual space from the view point and the view line of the observer BS in accordance with the position and information of the view point obtained by the head position measuring device 17A as well as information of the virtual space. The generated image is projected to the screen 11A by the projectors 14L and 14R. The image projected to the screen 11A is observed by the observer BS. The observer BS can differently see the image projected by the projectors 14L and 14R by his or her left and right eyes, respectively. The observer BS also can see simultaneously the projected virtual object and the real object existing there. Thus, the virtual space is provided to the observer BS along with the real space.

The position of the tip of the finger BSF contacting the operation portion 161 of the tactile sense provision device 16 is calculated on the basis of the output signal of the angle sensors SE1 and SE2. The actuators 165 and 166 are controlled to generate the reaction force so that the finger BSF of the observer BS cannot enter the virtual object (image). Thus, the observer BS can be provided with the tactile sense as if there is a real object.

Since the tactile sense provision device 16 is also coated with the retroreflection material 18A, the image projected by the projector 14A is also reflected by the tactile sense provision device 16 and can be seen by the observer BS. Since the image reflected by the tactile sense provision device 16 can be seen by the observer BS in the same way as the image reflected by the screen 11A, only the image projected by the projector 14A is provided to the observer BS. Since light rays in any direction except the line of view of the observer BS do not go back to the eyes due to the property of the retroreflection material 18A, the observer BS cannot see the tactile sense provision device 16. In other words, the tactile sense provision device 16 is transparent to the observer BS.

If the tactile sense provision device 16 is seen by the observer BS, the tactile sense provision device 16 may cause shielding of view, and the image provided by the projector 14A may have a blind spot, resulting in significant deterioration of reality.

Figure 6:
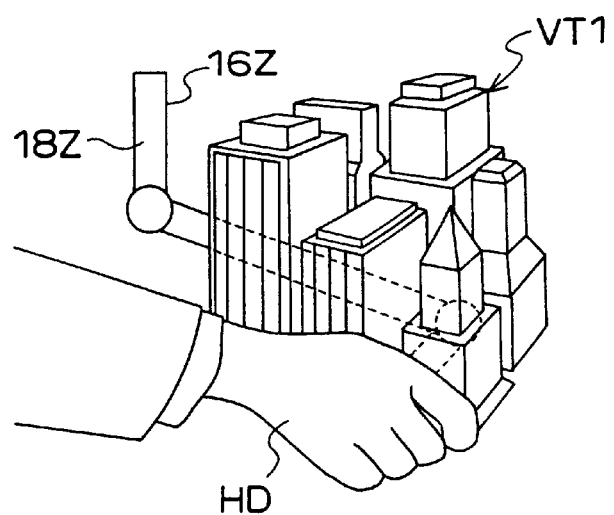
FIGS. 6(A) and 6(B) are diagrams showing an example of correct and incorrect shielding relationship.
Figure 6:
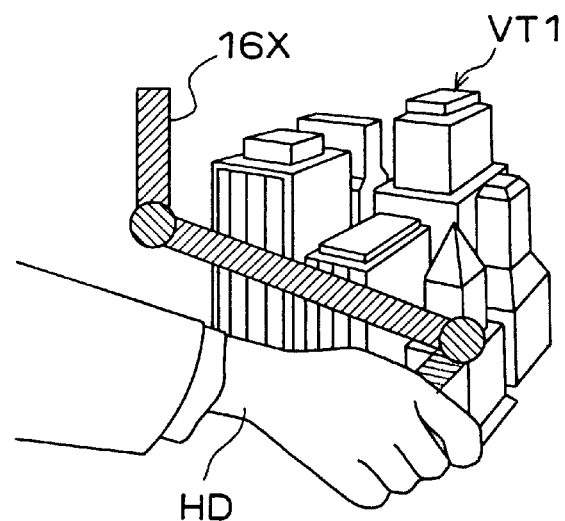

For example, as shown in FIG. 6(A), since the retroreflection material 18Z is coated on the surface of the tactile sense provision device 16Z, the tactile sense provision device 16Z becomes transparent and cannot be seen by the observer BS. The virtual object VT1 is shielded only by the hand HD. If the tactile sense provision device 16X on which the retroreflection material is not coated is used, the virtual object VT1 is shielded by the tactile sense provision device 16X as shown in FIG. 6(B), resulting in significant deterioration of reality.

Especially as in the present embodiment, when providing the tactile sense as a sense other than the visual sense in the virtual space, it is necessary to install a device such as a tactile sense provision device in front of the user. The conventional method for providing the virtual space, such as the CAVE or the CABIN using the rear projection type screen with naked eyes or a goggle for stereo viewing, has a disadvantage in that the device is seen inside the virtual environment and reality is substantially deteriorated. Though the device is not seen in the method for providing the virtual space using HMD, the hand of user is usually provided by CG. This method also lacks reality.

As in the present embodiment, by coating the retroreflection material 18A on the tactile sense provision device 16, and by projecting an image from the position that is conjugated to the position of eyes of the observer BS, the tactile sense provision device 16 can work as a part of the screen as if the tactile sense provision device 16 has disappeared from the virtual space. In addition, the shadow portion behind the tactile sense provision device 16 becomes a blind spot in the field of view of the observer BS. Therefore, a shadow is not generated.

Since the hand of the observer BS does not have the retroreflection function, the intensity thereof is very low compared with the image projected to the screen 11A. Therefore, user's hand does not enter in the image, but can be seen as the real hand.

As explained above, by selectively using the retroreflection material for the real object, unnecessary real object can be visually camouflaged to be "transparent." Namely, an optical camouflage is realized. Thus, the visual sense and the tactile sense are fused with each other, and proper shielding relationship is maintained between the real object and the virtual object so that a virtual space with high reality can be provided.

Thus, the information provision device 1A of the present embodiment satisfies the condition that only objects to be seen can be seen, which is necessary for the information provision device, "observee," that is observed.

As explained above, the retroreflection material can be coated on the real object such as the tactile sense provision device 16. Alternatively, a shielding screen having the retroreflection function can be made by coating the retroreflection material on a sheet of paper or cloth, so that the real object to be hidden can be covered by the shielding screen. Furthermore, all real objects including the tactile sense provision device 16, other sense provision devices, other devices, wires, or furniture can be hidden in the virtual space.

The information provision device 1A has other advantages as follows.

(1) Since the screen 11A is a retroreflection screen, sufficient intensity can be obtained for observing under a room light. In addition, since every object can be used as a screen by coating it with the retroreflection material, a display that is very light and can have any shape is realized.

(2) Since the image is projected from the position that is conjugated to the position of eyes of the observer BS, distortion due to a shape of the screen 11A cannot be generated.

(3) By narrowing the opening diameter of the image projection portion of the projector 14A within a range of sufficient light quantity, the depth of focus becomes deep so that sharp focus of the image can be obtained in a wide range for any shape and position of the screen 11A.

(4) Dependency of the screen intensity on distance is reduced.

(5) Since images observed by both eyes of the observer BS are separated in the space, a three-dimensional image observed with naked eyes can be realized. As a result of the three-dimensional viewing, surface dirt of the screen 11A, the background screen 19 and the tactile sense provision device 16, as well as the joint of the screens do not become so conspicuous.

(6) By integrating the projector 14A with optical components such as the semitransparent mirror 15A so as to be mounted on the head of the observer BS, the observer BS can look around or move around in the virtual room by moving his or her head.

(7) Since the configuration is relatively simple, the device can be realized at low cost.

Though the information provision device 1A has the screen 11A in the above-mentioned embodiment, the screen 11A can be omitted as shown in FIG. 2. In this case, images having the parallax for the left and right eyes are projected to the background screen 19, and the projected left and right images make the surface of the virtual image as if it is located at the position (distance) of the screen 11A'. The tactile sense provision device 16 provides the reaction force in accordance with the surface shape of the virtual image. Though the tactile sense provision device 16 is disposed in front of the background screen 19, the observer BS cannot see the tactile sense provision device 16 because of the coating of the retroreflection material on the tactile sense provision device 16, even if the screen 11A does not exist. Furthermore, it is possible to omit the background screen 19 instead of the screen 11A. In this case, images are projected to the screen 11A' as if the background is at the background position 19'.

In the above-mentioned embodiment, the background of the object to be transparent is a projected image.

Figure 1:
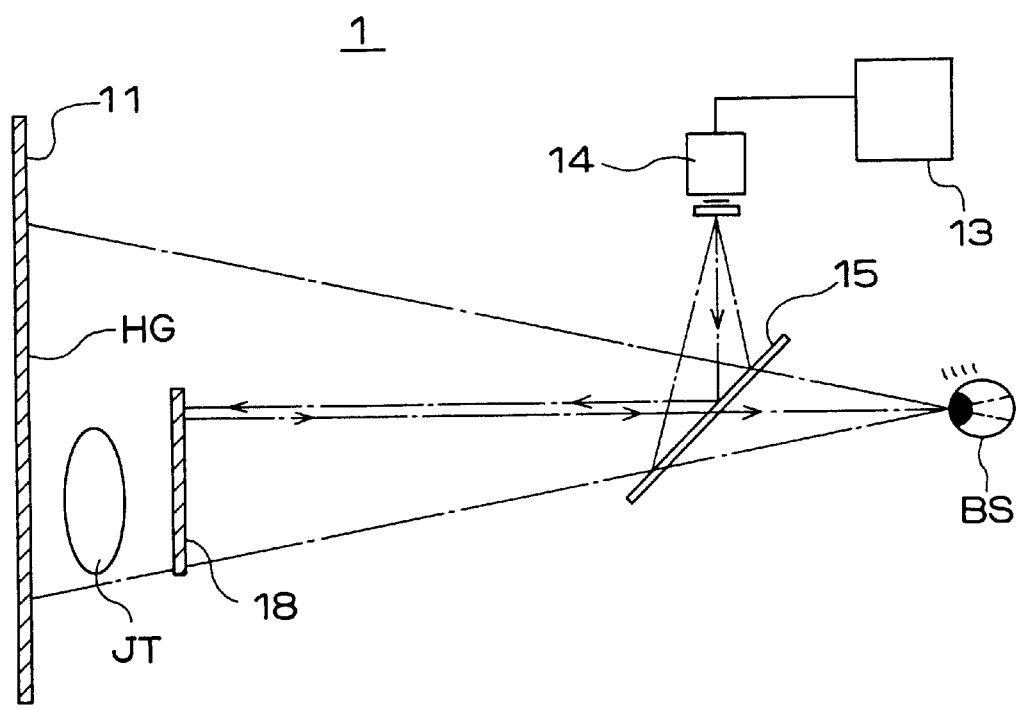
FIG. 1 is a diagram for explaining the principle of the present invention.

Namely, in the information provision device 1 shown in FIG. 1, the background of the real object JT is the image projected to the screen 11 by the projector 14. The image that is consistent with the image projected to the screen 11 is also projected to the real object JT, so that the real object JT is immersed in the image projected to the screen 11 and becomes transparent.

Also in the information provision device 1A shown in FIG. 2, the background of the operation portion 161 of the tactile sense provision device 16 that is a real object is the image projected to the screen 11A. In addition, concerning a part of the tactile sense provision device 16 including the arms 162–164 and the controller 160, the background thereof is the image projected to the background screen 19. Therefore, an image that is consistent with the image projected to the screen 11A is also projected to the operation portion 161, and an image that is consistent with the image projected to the background screen 19 is also projected to the part of the arms 162–164 and the controller 160, so that they are immersed in the image of the background and are transparent.

However, in the embodiment explained below, the background is not a projected image but a real object. In other words, in the case where the background is a real object, the object can be made to appear transparent by the embodiment explained below.

Figure 7:
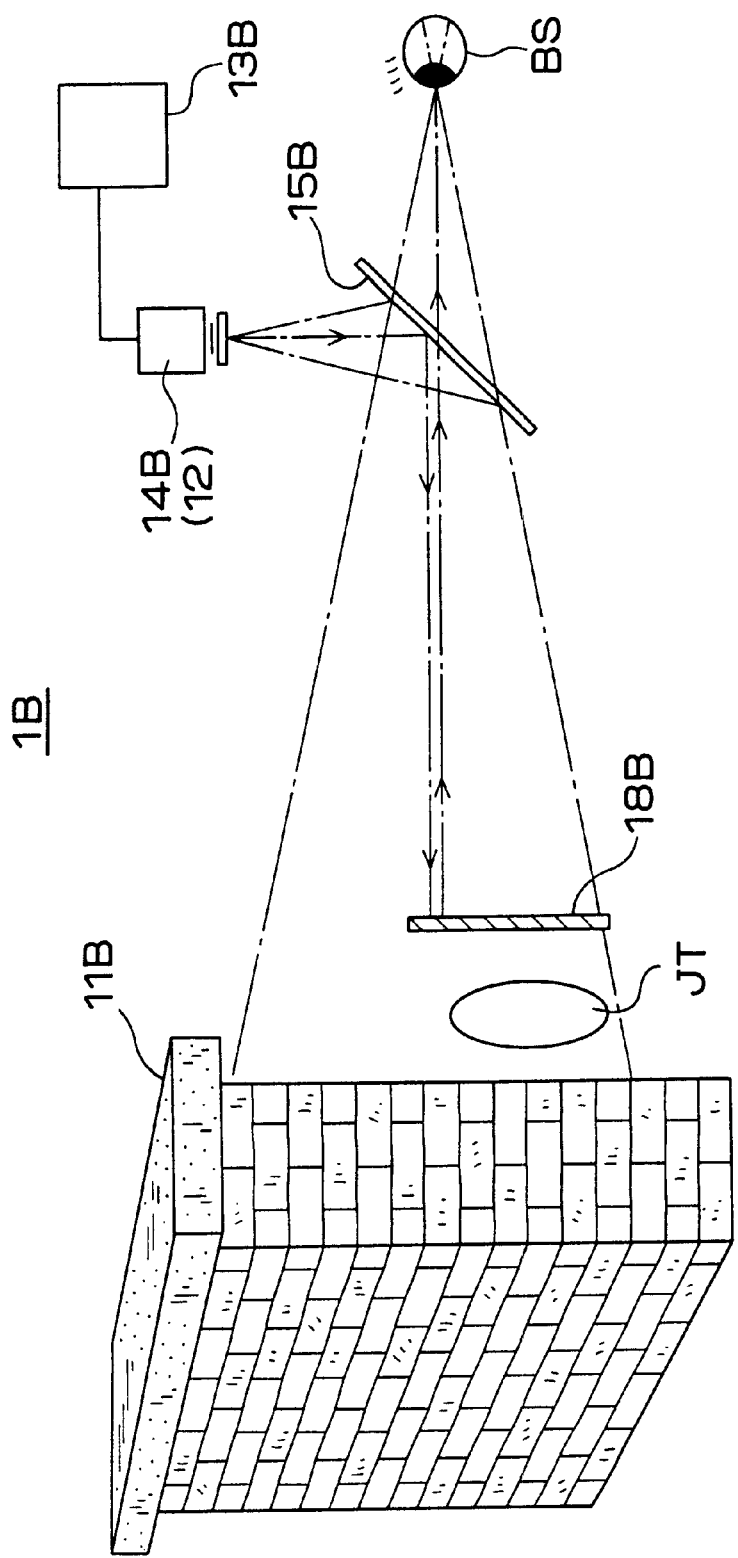
FIG. 7 is a diagram showing another embodiment of the information provision device according to the present invention.
Figure 8:
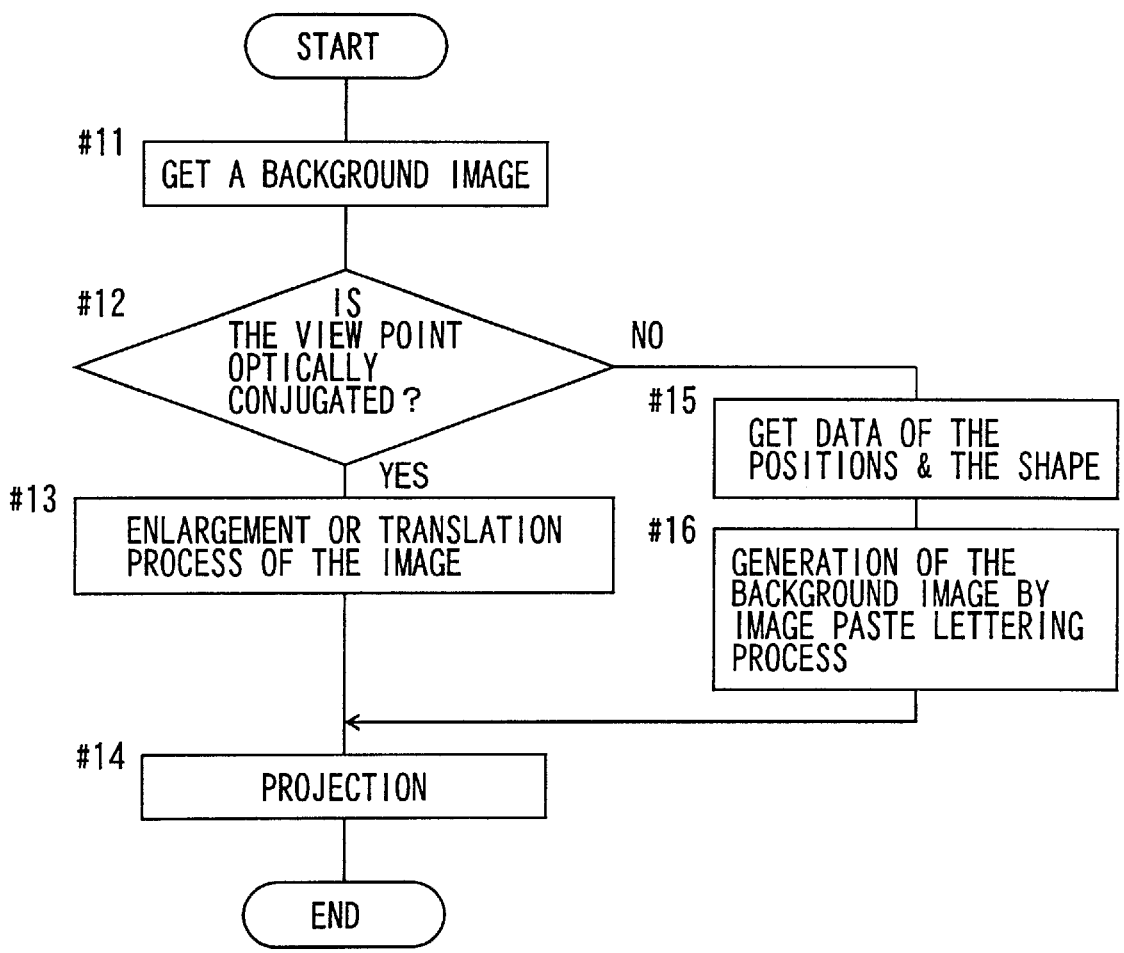
FIG. 8 is a flowchart showing the operation of the information provision device shown in FIG. 7.

FIG. 7 shows another embodiment of the information provision device 1B according to the present invention. FIG. 8 is a flowchart showing the process of the operation of the information provision device 1B.

In FIG. 7, the background object 11B is disposed as a background of the real object JT. The background object 11B is a wall made of brick in this embodiment. Another wall made of other materials, windows, rooms, a housing, a building, a garden, other fabrics, books, bookshelves, pictures, creatures, humans, animals, a landscape and any objects that really exist can be used.

When using these objects as the background object 11B, the picture of the background object 11B is taken by the camera 12, so that the image of the background object 11B is previously obtained. Alternatively, the picture of the background object 11B is taken at the same time as provision of the virtual space.

The image of the background object 11B is projected to the retroreflection material 18B for shielding the real object JT. The position and size of the image projected to the retroreflection material 18B are adjusted by the processor 13 to be consistent with the image of the background object 11B that is to be seen there by the observer BS. Therefore, the observer BS will see the image of the background object 11B projected to the retroreflection material 18B instead of the real object JT. Thus, the real object JT becomes transparent.

When taking a picture of the background object 11B by the camera 12, it is performed from the position that is the same as the view point of the observer BS or is optically conjugated to the view point of the observer BS. Thus, it is possible to overlap the image obtained from the picture without any preprocess on the real background object 11B so that they are consistent with each other.

However, there is a case where taking picture from that position is difficult or a case where the point of view of the observer BS moves along with the movement of the observer BS. In these cases, some amendment or deformation is added to the image obtained from the picture by using a well-known method such as image based rendering. For example, 3-D measurement of the background object 11B is performed, and then the image is amended or deformed in accordance with the relative position to the view point of the observer BS. Concerning the image based rendering method, there is another method described in "Generation of 3-D virtual space by using two-dimensional real image," (Hirose, Miyata and Tanigawa, Shingaku Giho, MVE 96-18, 1996).

In the flowchart shown in FIG. 8, the background image is obtained by taking a picture of the background object (step #11). If the position of the camera 12 for taking the picture and the point of view of the observer BS are optically conjugated with each other (Yes in step #12), enlargement or translation process of the image is performed if necessary (step #13), and the processed image is projected by the projector 14B (step #14).

If the position of the camera 12 for taking the picture and the point of view of the observer BS are not optically conjugated with each other (No in step #12), data about the position of the camera 12 for taking the picture, the point of view of the observer BS, the position of the background object 11B, and the shape of the background object 11B are obtained (step #15). In accordance with the data, the image based rendering process such as affine conversion is performed so as to convert the obtained image into a background image from the view point of the observer BS (step #16), and the converted image is projected by the projector 14B (step #14).

Figure 9:
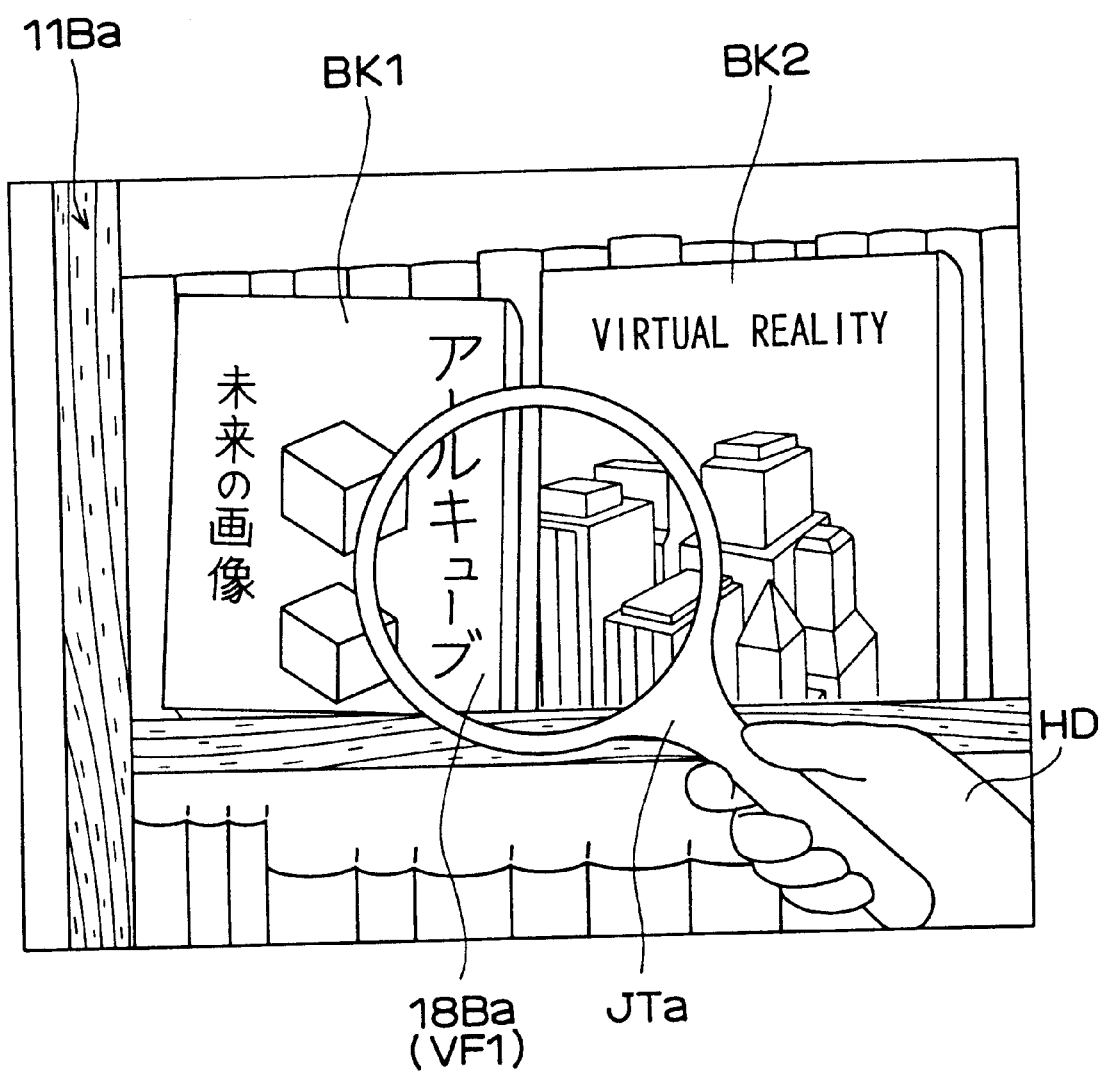
FIG. 9 is a diagram showing an example of information provision by using the information provision device shown in FIG. 7.

FIG. 9 shows an example of information provision using the information provision device 1B.

In FIG. 9, the bookshelf 11Ba is used as a background object. The bookshelf 11Ba contains many books as a normal usage. In front of the bookshelf 11Ba, two books BK1 and BK2 are placed facing the front direction. The observer BS exists in front of the front face of the bookshelf 11Ba (front side in the direction perpendicular to the paper sheet of FIG. 9). The observer BS holds the object that looks like a large loupe JTa by his or her hand.

The object JTa is opaque as a whole and a part of each of the two books BK1 and BK2 is hidden by the object JTa. The retroreflection material 18Ba is coated on the object JTa at a circular part corresponding to the lens. The image of the bookshelf 11Ba is obtained by camera 12, and the image VF1 after processed with position adjustment is projected to the retroreflection material 18Ba of the object JTa. The projected image VF1 displays the book BK1 and BK2 that is to be seen if the portion of the retroreflection material 18Ba is transparent.

In FIG. 9, the portion outside of the real object JTa is the bookshelf 11Ba itself, and the portion on the retroreflection material 18Ba inside the real object JTa is the image projected by the projector 14B. When the observer BS changes his or her view point, hand HD, or the real object JTa, the image VF1 corresponding to such change is projected to the retroreflection material 18Ba.

In FIG. 9, the image VF1 projected to the retroreflection material 18Ba is isometric to the images of the books BK1 and BK2 in the bookshelf 11Ba that is the background. By enlarging the image, the image VF1 can be larger than the image of the real object JTa. In addition, the amplification can be varied in accordance with, e.g., the distance between the books BK1, BK2 and the real object JTa. Thus, the real object JTa can be seen as if it was a real loupe, for example.

In other words, the portion corresponding to the lens of the real object JTa (the retroreflection material 18Ba) can be transparent by making the bookshelf 11Ba that is also a real object as background.

In the information provision device 1A shown in FIG. 2, the background screen 19 can be replaced by the background object 11B, whose image is obtained and projected to the portion such as the arms 162–164 or the controller 160, so that the arms 162–164 and other portions can be transparent.

In the above-mentioned embodiment, structures, shapes, sizes, materials and contents of the process of the part or the whole of the processors 13, 13A, 13B, the projector 14, 14L, 14R, 14B, the tactile sense provision device 16, 16Z, and the information provision device 1, 1A, 1B can be modified in accordance with the objects of the present invention, if necessary.

As explained above, the present invention can provide a proper shielding relationship between the real object and the virtual object, so that a virtual space with high reality can be provided.

According to claims 4, 7 and 8 of the present invention, a tactile sense is provided to the observer. By fusing the tactile sense with the visual sense, a virtual space with higher reality can be provided. Even if the tactile sense provision device is provided, the proper shielding relationship is maintained.

According to claims 6 and 9 of the present invention, the object can be transparent even if the background is the real object.

What is claimed is:

1. A method for providing information of virtual space to an observer by projecting an image to a screen, having retroreflection function on a surface thereof, by a projector disposed at a position optically conjugated to a position of eyes of the observer, wherein when a real object to be shielded by the virtual space exists, a part or the whole of the real object is optically hidden, by a shielding member having retroreflection function from the projection by the projector.

2. A method according to claim 1, wherein the real object is hidden by coating a retroreflection material on the real object.

3. A method according to claim 1, wherein the real object is hidden by placing a shielding screen having retroreflection function in front of the real object.

4. A method according to claim 1, wherein a tactile sense provision device for providing a tactile sense to the observer is provided and the tactile sense provision device is hidden by a shielding screen having retroreflection function.

5. A method for providing information of virtual space to an observer by projecting an image to a screen having retroreflection function by a projector disposed at a position optically conjugated to a position of eyes of the observer, the method being characterized by:

placing a real object between the observer and the screen;

providing retroreflection function to a portion of the real object to be shielded from view by the projector; and providing to the observer the image which is projected to the portion, to be shielded, of the real object instead of the image to be projected to the screen.

6. A method for providing information of virtual space by optically hiding a part or a whole of a real object placed between a background object and an observer, wherein retroflection function is provided to the portion of the real object to be hidden from view by a projector, an image of the background object is projected to the portion to be hidden from view of the real object by a projector disposed at a position optically conjugated to a position of eyes of the observer, and the image of the background object corresponds to the portion of the real object to be hidden.

7. An information provision device, comprising:

a projector, disposed at a position optically conjugated to a position of eyes of an observer, for projecting an image;

an image generator for generating an image of an object to be observed by the observer and for outputting the image to the projector;

a screen having retroreflection function for displaying the image projected by the projector; and a tactile sense provision device for providing a tactile sense to the observer, wherein the tactile sense provision device is optically shielded from the projection by the projector by a shielding member having retroreflection function.

8. An information provision device according to claim 7, wherein the projector is integrated with optical members for disposing the projector at the position optically conjugated to the position of eyes of the observer, and is adapted to be mounted on the head of the observer.

9. An information provision device for providing information of virtual space by optically hiding a portion of a real object placed between a background object and an observer, comprising:

a projector, disposed at a position optically conjugated to a position of eyes of the observer, for projecting an image;

a camera for taking a picture as an image of the background object; and a processor for outputting the image obtained by the camera to the projector so that the projector projects the image to the portion of the real object to be hidden, to which retroreflection function is provided.

* * * * *